Figure 1:
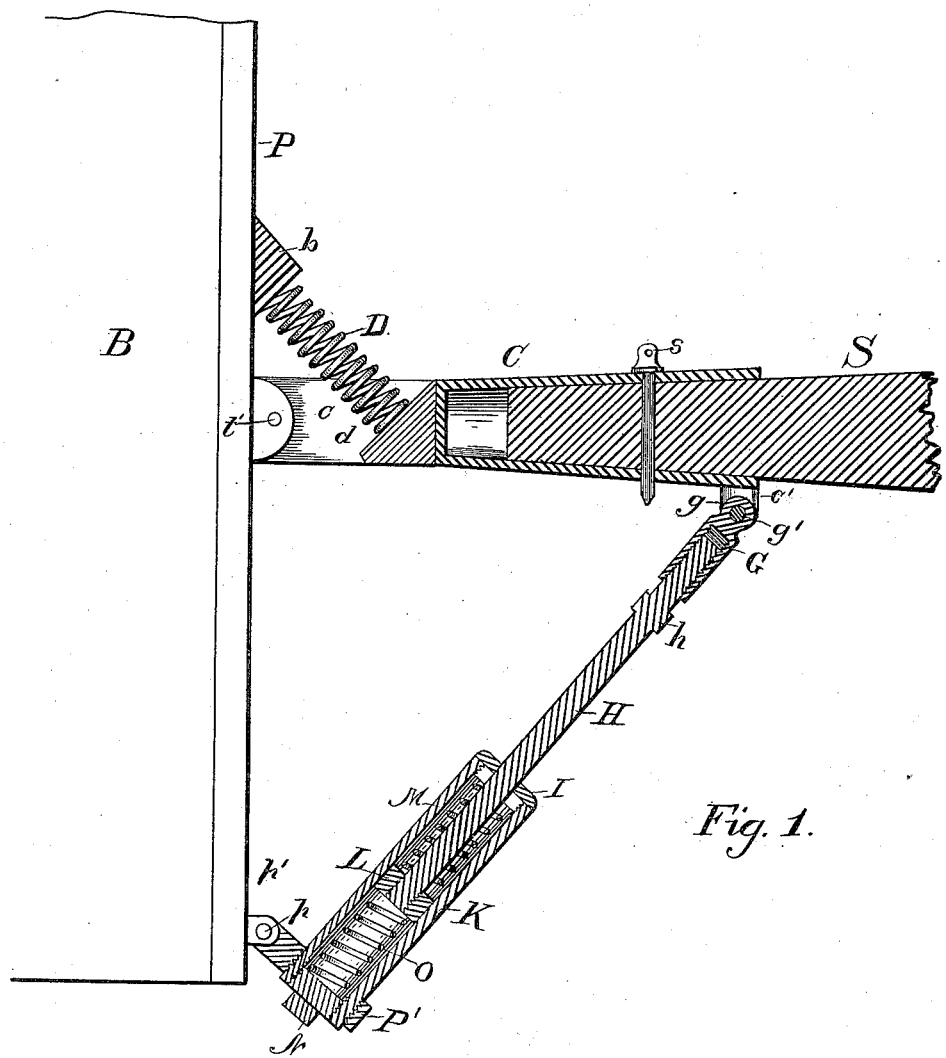

(No Model.) 2 Sheets—Sheet 1.

R. W. HARE & R. SPROUL.
SHAFT ATTACHMENT FOR VEHICLES.

No. 363,230. Patented May 17, 1887.

Witnesses:
J. B. McGinn
D. H. Alexander

Inventors,
Robert W. Hare and
Robert Sproul
By Connolly Bros
Attys

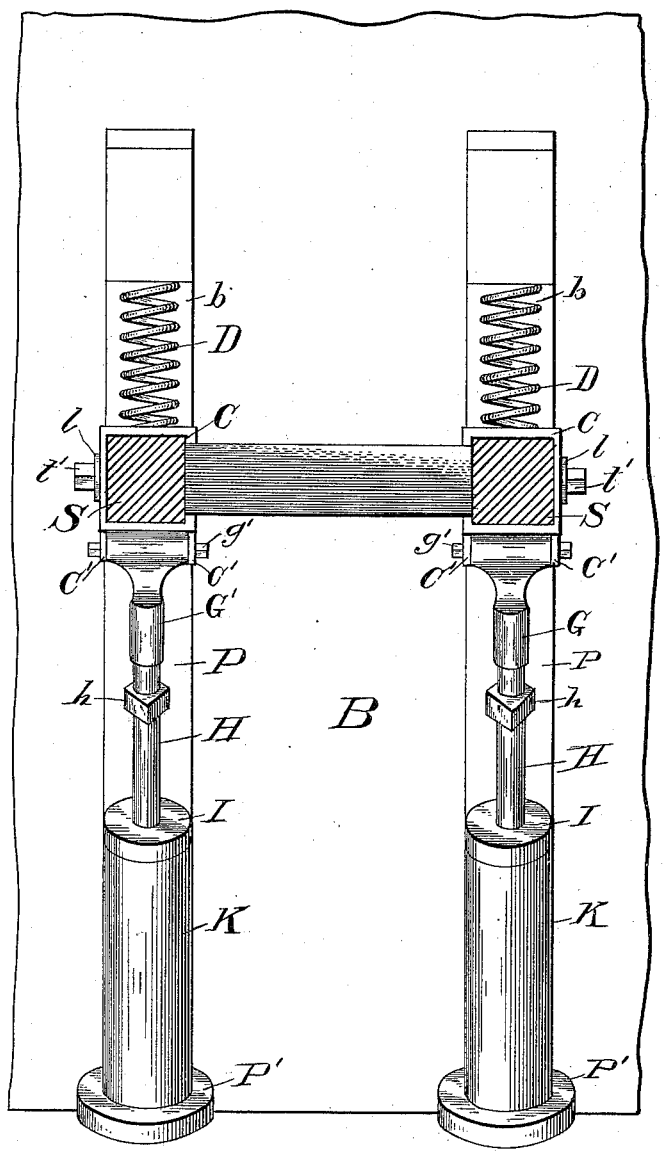

UNITED STATES PATENT OFFICE.

ROBERT W. HARE AND ROBERT SPROUL, OF PITTSBURG, PENNSYLVANIA.

SHAFT ATTACHMENT FOR VEHICLES.

SPECIFICATION forming part of Letters Patent No. 363,230, dated May 17, 1887.

Application filed February 5, 1887. Serial No. 226,722. (No model.)

*To all whom it may concern:*

Be it known that we, ROBERT W. HARE and ROBERT SPROUL, citizens of the United States, residing at Pittsburg, in the county of Allegheny and State of Pennsylvania, have invented certain new and useful Improvements in Means for Attaching Shafts to Vehicles; and we do hereby declare the following to be a full, clear, and exact description of the invention, reference being had to the accompanying drawings, which form part of this specification.

This invention has relation to means for attaching shafts to vehicles, and has for its object the provision of novel means for securing the shafts to the body of the vehicle, so as to do away with what is known as the "horse motion," and also to ease the weight and pressure upon the horse's back.

Our invention is particularly applicable to two-wheeled vehicles, as it is only in that class of vehicles where the shafts are rigidly secured to the vehicle that the horse motion is appreciable; and our invention consists, broadly, in the provision of means for pivotally securing the shafts of a two-wheeled vehicle to the body thereof and sustaining the shafts in their proper position relatively to the body by means of spring-braces connecting the shafts to the body on either side of the pivotal point, whereby the vertical motion communicated to the shafts by the movement of the horse when in action is taken up by the spring or springs and the disagreeable horse motion of the vehicle entirely obliterated.

Our invention further consists in the novel construction, combination, and arrangement of parts, hereinafter described and specifically claimed.

Referring to the accompanying drawings, illustrating our invention, Figure 1 is a vertical sectional view of a portion of a vehicle and its shafts with our improved shaft attaching device thereon; Fig. 2, an elevation of the same looking toward the front of the carriage.

B designates the carriage-body, to which is secured, back of the end of each shaft, a flat metallic plate, P, having eye-lugs $l\,l$ and a lump or block, $b$, at or near its upper end.

S designates the shafts, the ends of which fit into rectangular boxes or sockets C C. The sockets C terminate each in an eye, E, that fits between the lugs $l$, a bolt, $l'$, serving to pivotally secure the socket to the body. Between the front end and the eye E the socket C is cut out, as at $c$, and a stiff spiral spring, D, is inserted in the cavity, bearing at the bottom on a beveled surface, $d$, and at top on the block $b$, being secured to both in any suitable manner, as by bolts, staples, or other well-known fastening devices. At the forward end and bottom of the socket C C are eye-lugs $c'\,c'$, and between said lugs fit screw-threaded sockets G G, having eyes $g\,g$, bolts $g'\,g'$ passing through the lugs and eyes and securing them pivotally together.

Into the screw-threaded sockets G G are screwed bolts or rods H H, formed with squared portions $h\,h$, so as to permit of the bolts being screwed into or out of the sockets by means of an ordinary wrench or key.

The bolts or rods H H pass through screw-caps I I in the ends of cylindrical cases K K, and on the ends of said rods are screwed collars L L, and between the collars L L and the screw-caps I I are spiral springs M M, whose ends bear against said cap and collar, respectively. The lower ends of the cases $k\,k$ are closed by screw-caps N N, and between said screw-caps N N and the collars L L are placed spiral springs O O. The lower end of the cases $k\,k$ are screw-threaded on the outside, and the cases screw into collars P' P', which are pivoted by bolts $p\,p$ in eye-lugs $p'\,p'$ on the plate P.

Operation: The apparatus being constructed as described and firmly secured to the front of a two-wheeled vehicle, the shafts are placed in the sockets C C and secured therein by means of pins $s$, which pass through the sockets and the shafts, as shown. The shaft being then fitted in position, the tension of the upper and lower springs and the angle of the shafts relatively to the body of the vehicle are regulated by screwing the bolts or rods H H farther into or out of the sockets G G, thus elevating or lowering the boxes or sockets C C and regulating the resiliency of the springs in the cases K K. When in operation, the springs D and M receive the shock or jar of the upward movement of the shafts, and the springs O O below the collars L L receive the shock of the downward motion of the same, the resiliency of these springs serving to prevent the movement of the shafts from being communicated to the body of the vehicle. The device also serves the purpose of saving the horse's back from the constant jarring or pounding action that of necessity occurs when rigidly-attached shafts are employed.

It is obvious that the springs D D or the springs M M may be both employed; or either pair of them may be dispensed with, if desired, as the two pairs serve to sustain the shaft against movement in the upward direction, and hence by making one pair heavy enough to do the work the other pair may, as before stated, be dispensed with.

One of the disagreeable features of two-wheeled vehicles having rigidly-attached shafts is the dipping motion of the body that occurs when the vehicle is passing over hilly or uneven ground. Our devices correct this tendency to dipping a very great degree, as the shafts are capable of a certain amount of movement in a vertical direction without imparting such motion in any perceptible degree to the vehicle-body.

Having fully described our invention, we claim—

1. In a device for securing shafts to vehicles, the combination, with the straight front of the vehicle-body, a plate secured thereon, and shafts pivoted to said plate, of a spiral spring or springs arranged at an acute angle to said front and bearing upon the same and the shafts, substantially as described.

2. In a device for securing shafts to vehicles, the combination, with the vehicle-body and the shafts pivotally attached thereto, of a casing secured to the body and two springs in said casing, a rod pivotally attached to the shafts and projecting into said casing, and a collar fixed upon said rod between said springs, whereby said casing, springs, pivoted rod, and collar serve as a means for relieving both the upward and downward motion of the vehicle, substantially as described.

3. The combination of the vehicle-body B, the shaft S, and the socket C, adapted to receive said shaft and pivoted to said body, of the spring-brace comprising the rod or bolt I, the collar L thereon, the case K, and the springs M O therein, said rod being pivotally attached to said socket, and said case being secured to the vehicle-body, substantially as described.

In testimony that we claim the foregoing we have hereunto set our hands this 3d day of February, 1887.

ROBERT W. HARE.
ROBERT SPROUL.

Witnesses:
  JOS. B. CONNOLLY,
  JNO. F. ATCHESON.